United States Patent
Minami

(10) Patent No.: US 8,117,359 B2
(45) Date of Patent: Feb. 14, 2012

(54) MEMORY CONTROL APPARATUS AND METHOD

(75) Inventor: Toshiaki Minami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 12/708,733

(22) Filed: Feb. 19, 2010

(65) Prior Publication Data

US 2010/0146156 A1 Jun. 10, 2010

Related U.S. Application Data

(62) Division of application No. 11/485,285, filed on Jul. 13, 2006, now Pat. No. 7,716,387.

(30) Foreign Application Priority Data

Jul. 14, 2005 (JP) ................................. 2005-205707
Jul. 14, 2005 (JP) ................................. 2005-205708

(51) Int. Cl.
*G06F 13/18* (2006.01)

(52) U.S. Cl. ................. 710/40; 710/29; 710/33; 710/41; 710/52

(58) Field of Classification Search .................... None
See application file for complete search history.

(56) References Cited

U.S. PATENT DOCUMENTS

| | | | |
|---|---|---|---|
| 4,371,932 A | 2/1983 | Dinwiddie, Jr. et al. | |
| 4,492,450 A * | 1/1985 | Watanabe et al. | 396/48 |
| 4,755,933 A * | 7/1988 | Teshima et al. | 711/157 |
| 5,123,107 A * | 6/1992 | Mensch, Jr. | 716/125 |
| 5,371,849 A * | 12/1994 | Peaslee et al. | 345/553 |
| 5,535,417 A | 7/1996 | Baji et al. | |
| 5,553,310 A * | 9/1996 | Taylor et al. | 710/40 |
| 5,644,576 A | 7/1997 | Bauchot et al. | |
| 5,870,622 A | 2/1999 | Gulick et al. | |
| 5,901,321 A * | 5/1999 | Kim et al. | 710/264 |
| 5,905,897 A * | 5/1999 | Chou et al. | 710/260 |
| 6,247,084 B1 * | 6/2001 | Apostol et al. | 710/108 |
| 6,247,104 B1 | 6/2001 | Suzuki | |
| 6,272,579 B1 * | 8/2001 | Lentz et al. | 710/116 |
| 6,415,364 B1 | 7/2002 | Bauman et al. | |
| 6,480,916 B1 * | 11/2002 | Shishizuka et al. | 710/107 |
| 6,618,780 B1 * | 9/2003 | Popat | 710/264 |
| 6,665,314 B1 * | 12/2003 | Liebenow | 370/477 |
| 6,694,398 B1 * | 2/2004 | Zhao et al. | 710/260 |
| 6,704,847 B1 | 3/2004 | Six et al. | |
| 6,738,881 B1 | 5/2004 | Ollivier et al. | |
| 6,898,678 B1 | 5/2005 | Six et al. | |
| 6,907,491 B2 * | 6/2005 | Moss | 710/309 |
| 6,941,406 B2 | 9/2005 | Sano et al. | |

(Continued)

OTHER PUBLICATIONS

PCI, PCI Express Base Specification, Mar. 2005, PCI SIG, Rev 1.1, pp. 1-508.

(Continued)

*Primary Examiner* — Cheng-Yuan Tseng

(74) *Attorney, Agent, or Firm* — Fitzpatrick, Cella, Harper & Scinto

(57) ABSTRACT

A memory control apparatus generates a plurality of commands whose unit of data transfer is smaller than the unit of data transfer of a memory access request, and when the memory access requests are transmitted from a plurality of request sources, issues the plurality of commands to a memory in alternate order for each request source. The plurality of memory access requests are executed by time division and concurrently.

12 Claims, 16 Drawing Sheets

U.S. PATENT DOCUMENTS

| | | |
|---|---|---|
| 7,114,041 B2 | 9/2006 | Hammitt et al. |
| 7,149,850 B2 | 12/2006 | Minami |
| 7,415,550 B2 | 8/2008 | Tanaka et al. |
| 7,457,903 B2 * | 11/2008 | Purdham et al. ............... 710/269 |
| 2004/0076044 A1 * | 4/2004 | Nowshadi ..................... 365/200 |
| 2006/0026309 A1 | 2/2006 | Day et al. |
| 2007/0043910 A1 | 2/2007 | Minami |

OTHER PUBLICATIONS

Altera, PCI-to-DDR SDRAM Reference Design, May 2003, Altera, pp. 1-34.

Notice of Allowance dated Mar. 12, 2010 in parent U.S. Appl. No. 11/485,285.

* cited by examiner

MEMORY CONTROL APPARATUS AND METHOD

This application is a divisional of U.S. patent application Ser. No. 11/485,285, filed Jul. 13, 2006 (pending), the contents of which are incorporated by reference herein.

BACKGROUND OF THE INVENTION

1. Field of the Invention

The present invention relates to a memory control apparatus and method.

2. Description of the Related Art

As the semiconductor and microprocessor technologies progress, the field of application of embedded systems is steadily expanding. Most popular electronic and electric devices use embedded systems. Additionally, along with the recent increase in integration of LSIs, a so-called system LSI is becoming common which integrates the controller function of an embedded device in one LSI.

FIG. 7 is a view showing a configuration that implements an embedded system of OA equipments by using a system LSI disclosed in, e.g., U.S. Pat. No. 6,480,916.

Referring to FIG. 7, a system LSI 100, memory 101, and various kinds of IO interfaces are mounted on an embedded system board 110. The system LSI 100 is a single-chip scanning printing engine. More specifically, the system LSI 100 incorporates a processor core, processor peripheral controller, memory controller, scanner controller, printer controller, PCI interface, and USB device interface.

The IO interfaces provided on the embedded system board 110 are a scanner IF 131, FAX IF 132, USB IF 134, and printer IF 133. These IO interfaces are connected to a scanner 121, FAX 122, PC 124, and printer engine 123 to form the entire system. The system LSI 100 also has a PCI bus IF 136. With the PCI bus IF 136, an HDD 125 connected to an IDE bus 135 can be used through a PCI-IDE bridge 102.

FIG. 2 is a block diagram for explaining the system LSI 100 in more detail.

A processor 201 can incorporate a cache memory of 32 Kbytes (16 Kbytes for each of instruction and data), FPU (Floating Point Unit), MMU (Memory Management Unit), and user-definable coprocessor.

Since a PCI bus interface 232 is present, the system LSI 100 can be used together with a computer system having a PCI bus slot. In addition to the PCI satellite configuration, the PCI host bus bridge configuration can issue a PCI bus configuration. Hence, when combined with an inexpensive PCI peripheral device, the system LSI 100 can be used as the main engine of a multifunction peripheral. The system LSI 100 can also be combined with a rendering engine or compression/decompression engine having a PCI bus interface.

The chip incorporates two independent buses, i.e., an IO bus (B bus) 221 to connect a general-purpose IO core and a graphics bus (G bus) 220 optimized for image data transfer. A memory 204 (101), the processor 201, and these buses are connected through a system bus bridge 203 serving as a cross bus switch. With this configuration, high-speed parallel data transfer necessary for simultaneous operation in a multifunction system is implemented.

The system LSI 100 also incorporates a memory controller 202 that supports a synchronous DRAM (SDRAM) with high cost performance for access to a continuous data sequence represented by image data.

The system LSI 100 also incorporates a scanner controller 205, printer controller 206, PCI controller 207, USB controller 208, UART 209, MISC module 210 including a timer/GPIO function, and LAN controller 211. Reference numerals 230 to 233 denote IO interfaces of the controllers 205 to 208. These IO interfaces are identical to the interfaces 131, 133, 134, and 136 with the same names in FIG. 7.

FIG. 3 is a timing chart for explaining the sequence of a typical composite operation. In this example, a so-called copy operation is executed in which the scanner 121 scans a document, and the printer engine 123 prints the scanned document. Image data obtained by scanning a document is transmitted from the scanner 121 to the scanner controller 205 incorporated in the system LSI 100 through the scanner interface 131 (230) (301). The scanner controller 205 stores the received image data in the memory 204 (101) by DMA (302). The printer controller 206 reads out the data from the memory 204 by DMA (303) and transmits the data to the printer engine 123 through the printer interface 231 (133) (304). The printer engine 123 prints the data.

At this time, PDL data is also transmitted from the PC 124 through the USB interface 134 (233) (311). The PDL data is received by the USB device controller 208 and temporarily stored in the memory 204 by DMA (312). The PDL data is interpreted by the processor 201 in the system LSI 100. The bitmapped image is stored in the memory 204 again (313). Finally, the image data is read out from the memory 204 by the printer controller 206 (314), transmitted to the printer engine 123 through the printer interface 231 (133) (315), and printed.

FIG. 4 shows a physical address space handled by the processor 201 at this time. Actually, the processor 201 is compatible with MIPS R4000. Software on the processor 201 runs by using a virtual address. The processor 201 always operates in a kernel mode. Physical addresses 0x0000_0000 to 0x1fff_ffff correspond to virtual addresses 0x8000_0000 to 0x9fff_ffff (kseg0: cached) and 0xa000_0000 to 0xbfff_ffff (kseg1: uncached).

In this prior art, the memory 204 has a capacity of 32 MB and incorporates a 256-Mbit SDRAM with a 16-bit×4-bank× 4M-word configuration. Hence, the physical address space usable as a RAM corresponds to addresses 0x0000_0000 to 0x0ff_ffff.

When the composite operation shown in FIG. 3 is executed, software running on the processor 201 manages the buffer area on the memory 204 used by hardware. Like a normal case wherein a memory area is dynamically ensured by software, an area with a necessary size is ensured in the Heap area by using a memory allocate function (a system function provided by the OS: e.g., malloc).

In the composite operation shown in FIG. 3, the buffer area write-accessed by the scanner controller 205 by DMA is the same as the buffer area read-accessed by the printer controller 206 by DMA. If there is only one buffer area, the address written by the scanner controller 205 is read out by the printer controller 206 later. However, the speed of read from a scanner and the speed of printing by a printer are normally different. Hence, if there is no mechanism for synchronizing the scanner controller 205 with the printer controller 206, the read address may go ahead of the write address.

To avoid this, the buffer is generally doubled. More specifically, while the scanner controller 205 write-accesses one buffer area by DMA, the printer controller 206 read-accesses the other buffer area by DMA. When DMA transfer of both controllers is ended, the buffers to be used by them are replaced, and next DMA is started.

For example, when 1-MB data is continuously transmitted from the scanner 121 to the scanner controller 205, the argument of the memory allocate function is set to 1 MB and called. The returned address is (converted from a virtual address to a physical address) set to the DMA start address of the scanner controller 205. In this case, addresses 0x0080_0000 to 0x008f_ffff are ensured, and the first address 0x0080_0000 is set to the DMA start address. When data arrives, the scanner controller 205 continuously stores the data from the start address by DMA. When DMA is ended, the address 0x0080_0000 is set to the DMA start address of the printer controller 206. When software instructs to start DMA, the data is sequentially read out from the set start address in accordance with the signal of the printer interface 231 and transferred to the printer engine 123 through the printer interface 231.

At the same time, the next DMA setting is done for the scanner controller 205. The argument of the memory allocate function is set to 1 MB and called again. When addresses 0x0090_0000 to 0x009f_ffff are ensured, the first address 0x0090_0000 is set to the DMA start address. When data from the scanner interface 230 arrives, the scanner controller 205 continuously stores the data from the start address by DMA.

In this way, the DMA operation is repeatedly executed while using the two areas corresponding to the addresses 0x0080_0000 to 0x008f_ffff and 0x0090_0000 to 0x009f_ffff in alternate order between the scanner controller 205 and the printer controller 206.

For the USB controller 208, addresses 0x00b0_0000 to 0x00bf_ffff are ensured, and the first address 0x00b0_0000 is set to the DMA start address. When data is transmitted from the PC (USB host) 124, the USB controller 208 continuously stores the data from the start address by DMA. When all transfer is ended, the software is notified of it by an interrupt. Next, the software interprets PDL data and generates print image data. The finally generated print image data is stored in a newly ensured buffer area. To do this, the memory allocate function is called again to ensure a 3-MB area corresponding to addresses 0x00c0_0000 to 0x00ef_ffff. The address 0x00c0_0000 is set to the DMA start address, and the printer controller 206 is activated. DMA transfer of the printer controller 206 at this time is executed exclusively of DMA transfer of the printer controller 206 in the above-described scanner printer operation.

As described above, when the scanner and printer simultaneously access the HDD, a plurality of hardware devices simultaneously DMA-access the memory in the system LSI.

When a plurality of masters issue access requests for only one memory source in the system LSI, the access requests always conflict at a certain probability. For, e.g., the printer controller that must continuously supply data to the printer engine, an increase in latency in case of access confliction must be taken into consideration. Hence, the FIFO capacity to buffer the data rate must be large to deal with the worst delay value. This increases the circuit scale and chip cost. In addition, various adverse effects such as an increase in heat and a decrease in reliability occur.

For example, assume that 32-byte data is transferred in one cycle of DMA transfer. If the capacity of the FIFO memory is only 32 bytes, the next DMA transfer cycle can start after the FIFO becomes vacant. This configuration cannot be used when data must continuously be supplied to the printer engine once the printer operation starts, like the above-described printer controller. The FIFO is always required to have a capacity to store data of a plurality of DMA transfer cycles. The FIFO needs to have a capacity for at least two DMA transfer cycles, i.e., a capacity of 64 bytes.

Assume the printer interface has a FIFO with a capacity of 64 bytes. When the contents of the FIFO decrease to 32 bytes or less, the printer interface can issue the next DMA transfer request to the memory controller. When the next data is read out from the memory and written in the FIFO by DMA transfer before the FIFO becomes vacant, data can continuously be supplied to the printer engine.

If there is no master issuing a memory access request simultaneously as the printer interface issues a DMA transfer request to the memory controller, the data can be read out and stored in the FIFO before the FIFO becomes vacant. However, if another master has issued an access request to the memory controller immediately before, the printer controller cannot read out the data from the memory and store it in the FIFO until the memory access request is processed.

Under some circumstances, data read by the printer controller may delay along with the increase in delay time, and the FIFO may be vacant meanwhile.

To avoid this, the printer controller has a FIFO capacity of at least, e.g., 128 bytes to prevent any problem even in the worst case. If memory conflict rarely occurs, a capacity of 64 bytes or 96 bytes at best suffices in most cases. However, to deal with a rare case, the circuit scale is increasing.

SUMMARY OF THE INVENTION

It is an object of the present invention to decrease the capacity of a buffer FIFO by suppressing an increase in memory access latency of each master even when memory accesses from a plurality of masters conflict.

It is another object of the present invention to provide a memory control apparatus and method which divide a unit of data transfer and execute memory access in alternate order when memory access requests are issued from a plurality of masters simultaneously.

A memory control apparatus according to the present invention comprises generation means for generating a plurality of commands whose unit of data transfer is smaller than a unit of data transfer of a memory access request, and issue means for, when the memory access requests are transmitted from a plurality of request sources, issuing the plurality of commands to a memory in alternate order for each request source, wherein the plurality of memory access requests are executed by time division and concurrently.

Another memory control apparatus according to the present invention comprises storage means for storing read data as a result of access to a memory in accordance with read requests from a plurality of request sources, and transfer means for transferring the read data from the storage means in an order corresponding to priority set for the plurality of request sources.

Further features of the present invention will become apparent from the following description of exemplary embodiments (with reference to the attached drawings).

DESCRIPTION OF THE EMBODIMENTS

The first embodiment of the present invention will be described below in detail with reference to the accompanying drawings.

Figure 8:
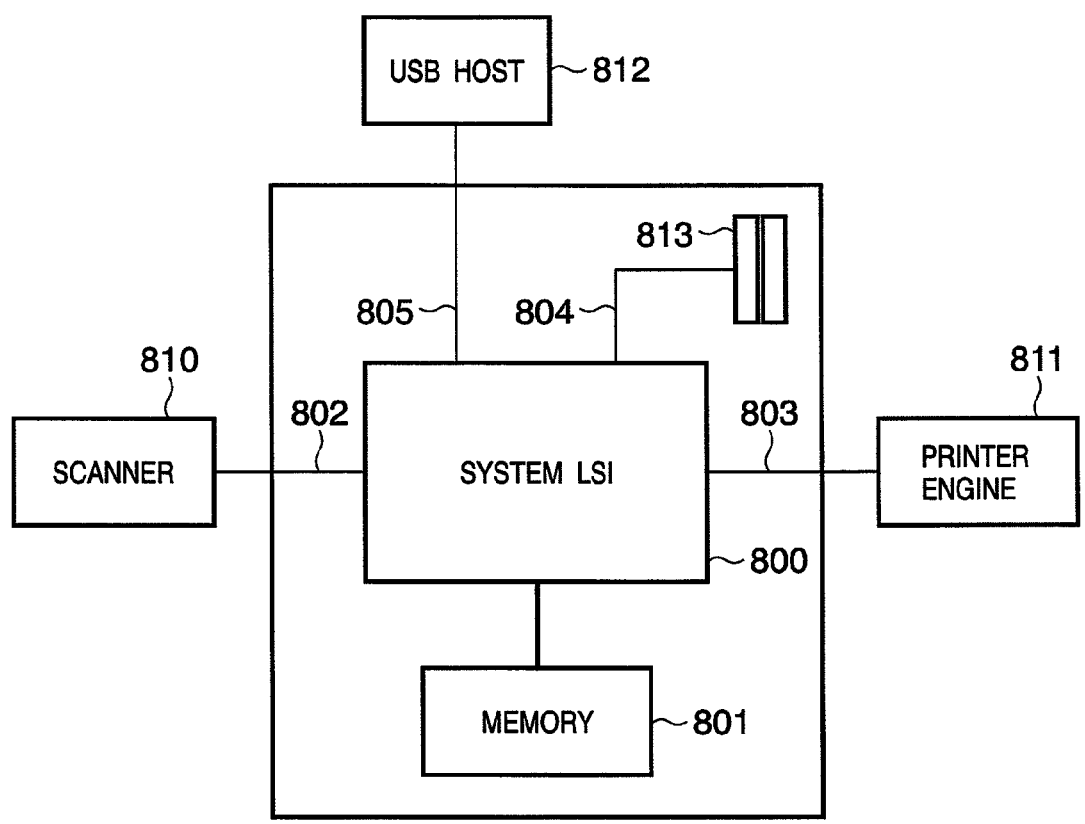
FIG. 8 is a block diagram for explaining a system configuration according to the first embodiment of the present invention.

FIG. 8 is a block diagram for explaining the first embodiment of the present invention. Referring to FIG. 8, a system LSI 800 incorporates a processor, memory controller, a plurality of hardware engines having a DMA function, and a plurality of functional modules which are not illustrated for the descriptive convenience. A memory 801 is controlled by the memory controller incorporated in the system LSI 800 and includes four 256-Mbit memories with a 4-bank configuration. Reference numerals 802 to 805 denote external IO interfaces including the scanner interface 802, printer interface 803, PCI interface 804, and USB interface 805. The external IO interfaces 802 to 805 are connected to the plurality of hardware engines in the system LSI 800. A scanner 810 is connected to the system LSI 800 through the scanner interface 802. A printer engine 811 is connected to the system LSI 800 through the printer interface 803. A USB host 812 is connected to the system LSI 800 through the USB interface 805. A PCI expansion slot 813 is connected to the system LSI 800 through the PCI interface 804.

More specifically, the hardware engines are a scanner controller, printer controller, PCI interface, and USB device interface. However, the hardware engines include not only devices related to the IO interfaces but also hardware engines that execute image processing, image encoding/decoding, and data compression/decompression. The hardware engines have both a DMA controller for read and a DMA controller for write. This will be described next in detail with reference to FIG. 9.

Figure 9:
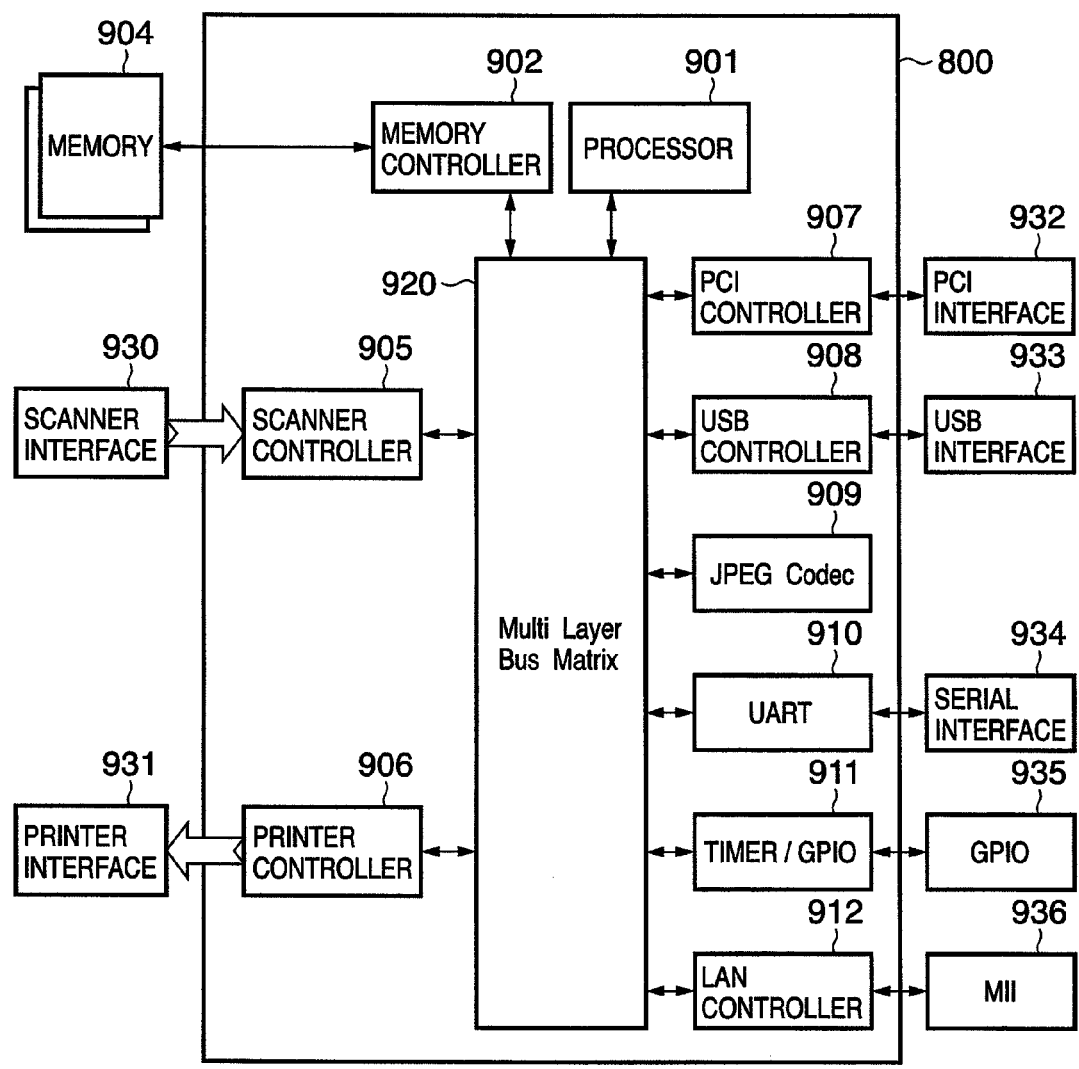
FIG. 9 is a block diagram for explaining a system LSI according to the first embodiment of the present invention.

FIG. 9 is a block diagram for explaining the detailed configuration of the LSI 800 in FIG. 8 according to this embodiment.

Referring to FIG. 9, a processor 901 has a function compatible with MIPS R4000. A scanner controller 905 is connected to the external scanner 810 through a scanner interface 930. A printer controller 906 is connected to the external printer engine 811 through a printer interface 931. A PCI controller 907 having a PCI host bridge function is connected to one or a plurality of external PCI target devices through a PCI interface 932. A USB device controller 908 is connected to the external USB host 812 through a USB interface 933.

A memory 904 has a total capacity of 128 MB and includes four 256-Mbit DDR SDRAMs with a 16-bit×4-bank×4M-word configuration. The memory 904 corresponds to the memory 801 in FIG. 8.

A JPEG compression/decompression engine 909 has a function of reading out JPEG-encoded data on the memory 904 by read DMA, decoding the data, and writing the raw image data in the memory 904 by write DMA. The JPEG compression/decompression engine 909 also has a function of reading out raw image data on the memory 904 by read DMA, encoding the data, and writing the encoded data in the memory 904 by write DMA.

A system bus 920 connects the processor 901 serving as a bus master, the hardware engines, a memory controller 902 serving as a bus slave, and other devices. The system bus 920 is not a common bus but has a multi-layered architecture capable of multiple-connecting a plurality of bus maters and a plurality of bus slaves.

Figure 1:
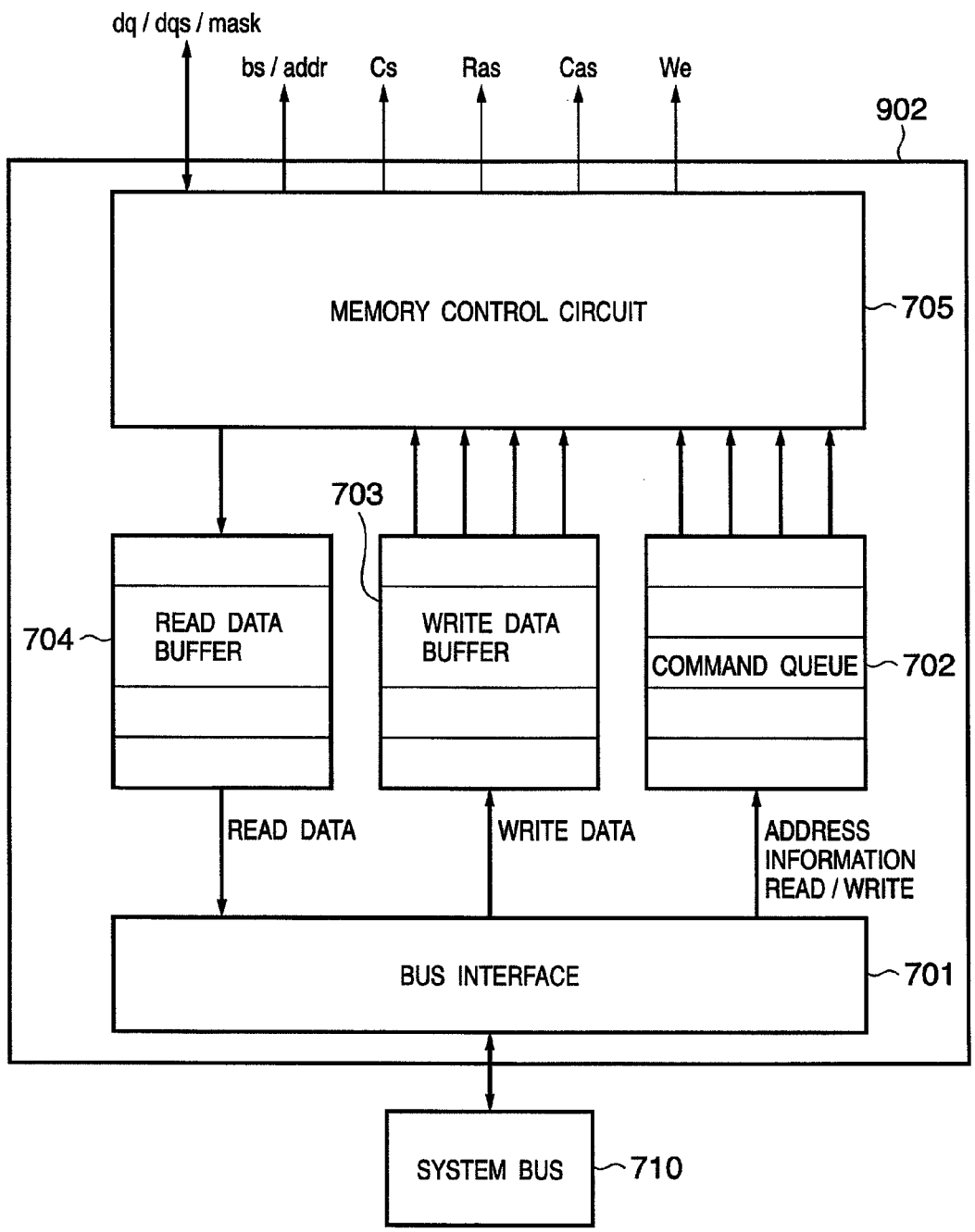
FIG. 1 is a block diagram for explaining the configuration of a memory controller according to the first embodiment of the present invention.
Figure 2:
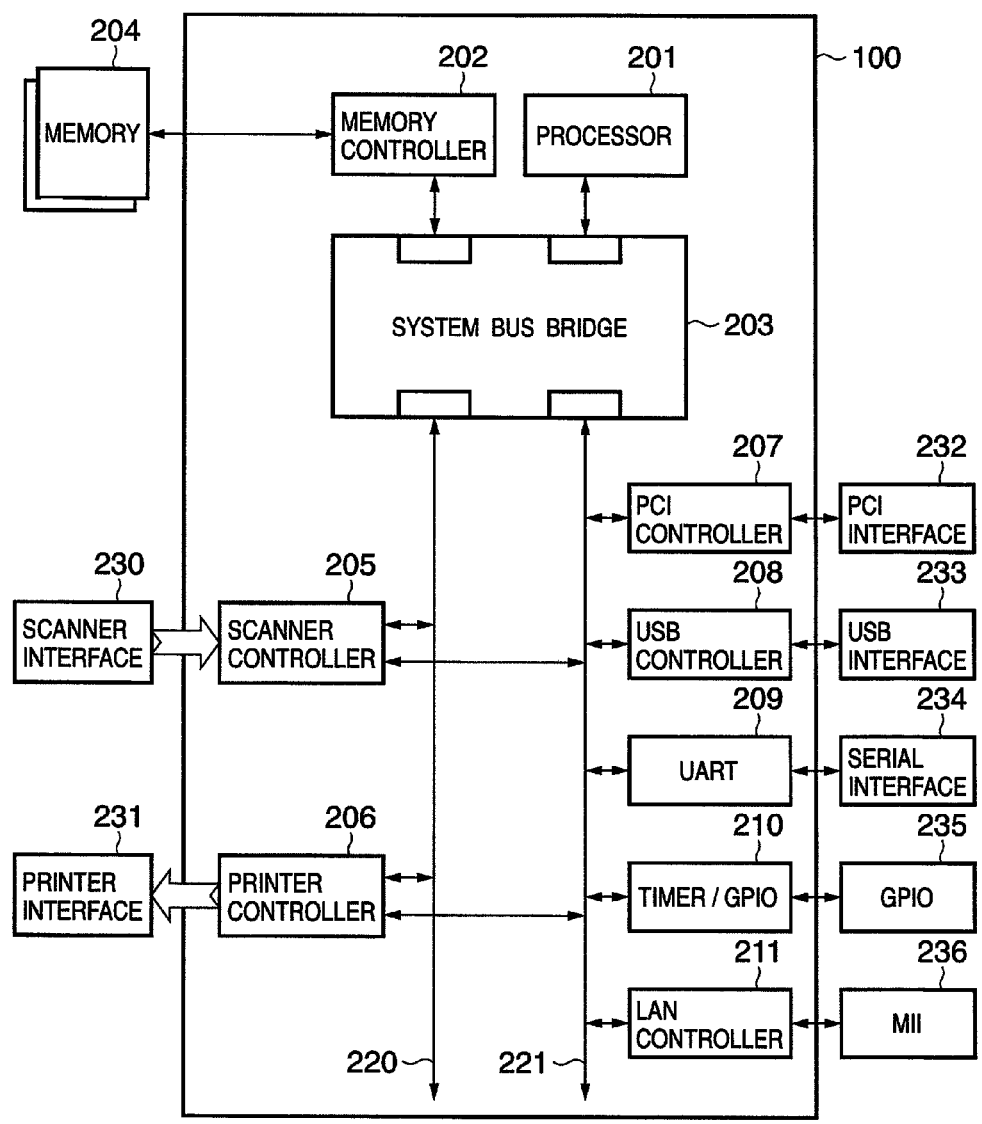
FIG. 2 is a block diagram for explaining a conventional configuration.
Figure 3:
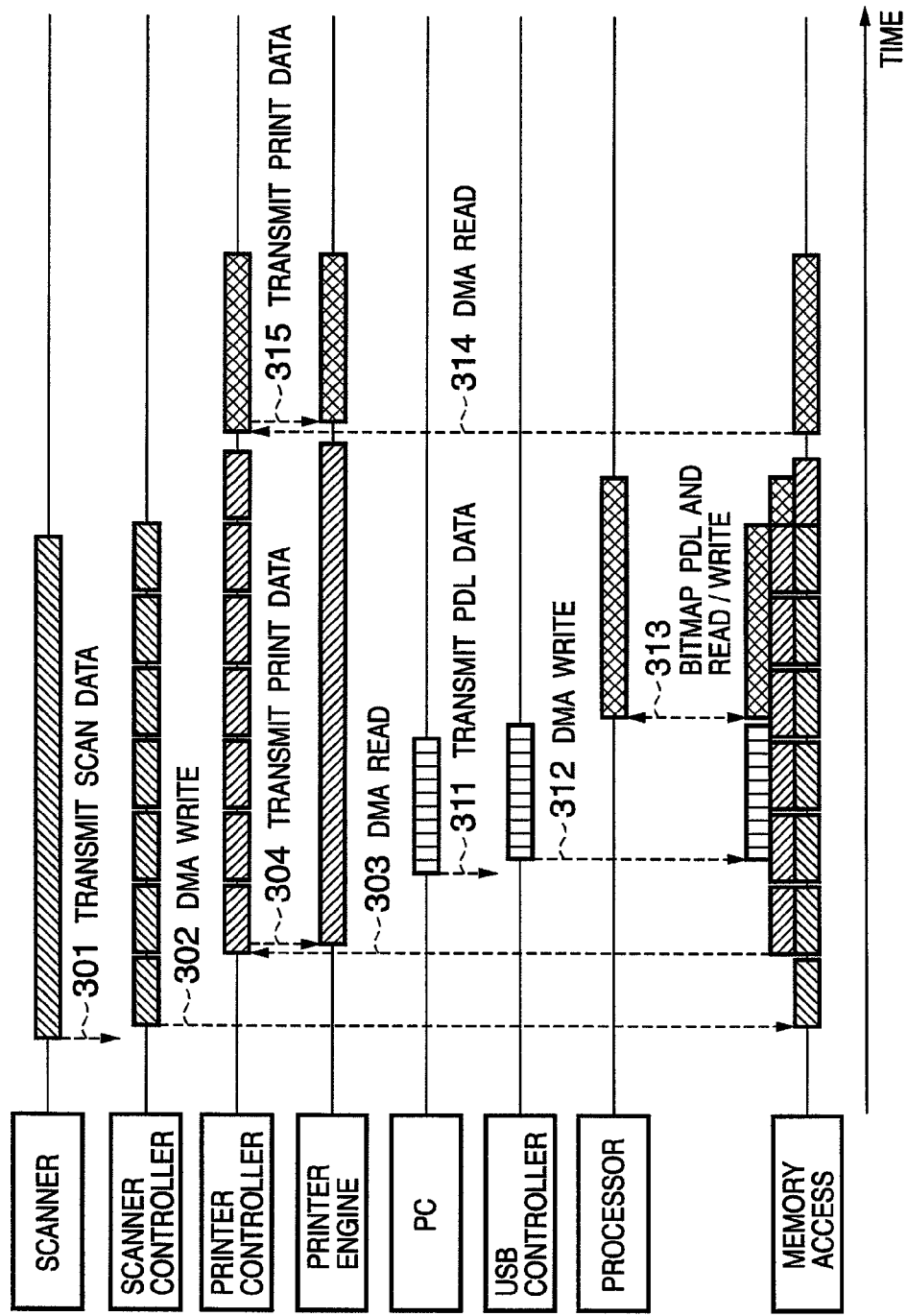
FIG. 3 is a timing chart for explaining the composite operation sequence of an embedded device.
Figure 4:
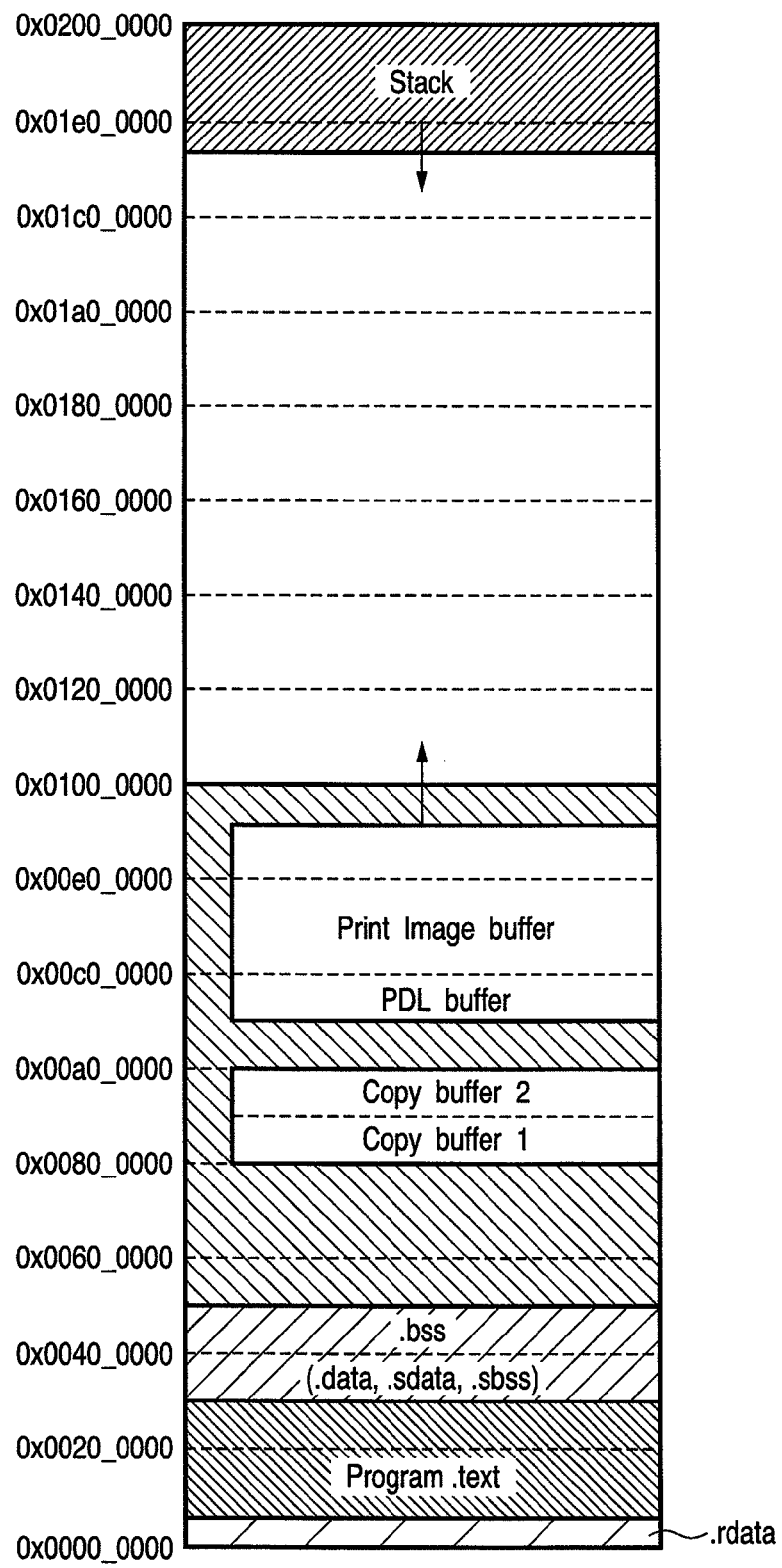
FIG. 4 is a view for explaining a conventional memory use method.

The memory controller 902 supports the DDR SDRAM, and details are shown in FIG. 1.

Figure 5:
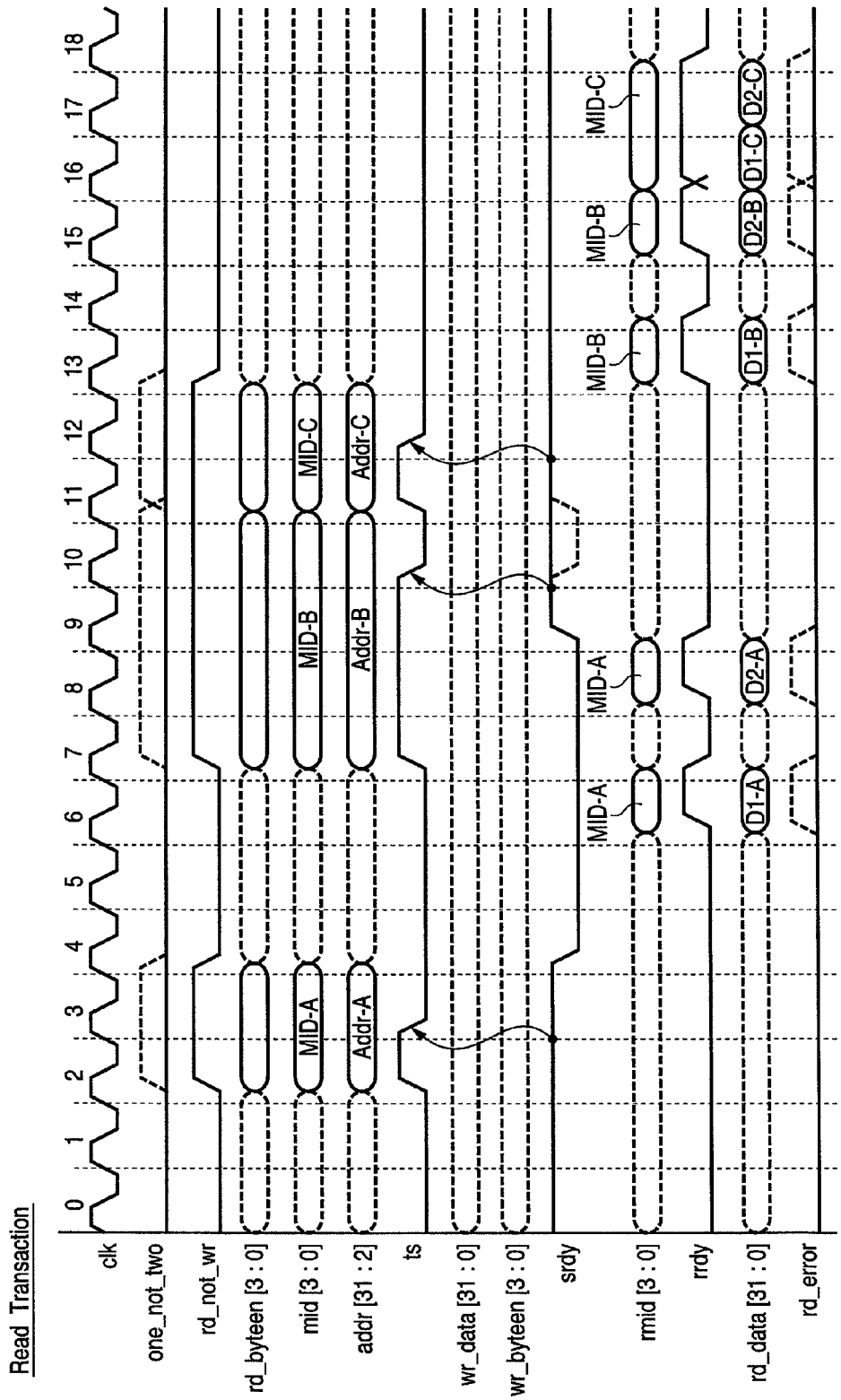
FIG. 5 is a timing chart for explaining the protocol of a system bus according to the first embodiment of the present invention.
Figure 6:
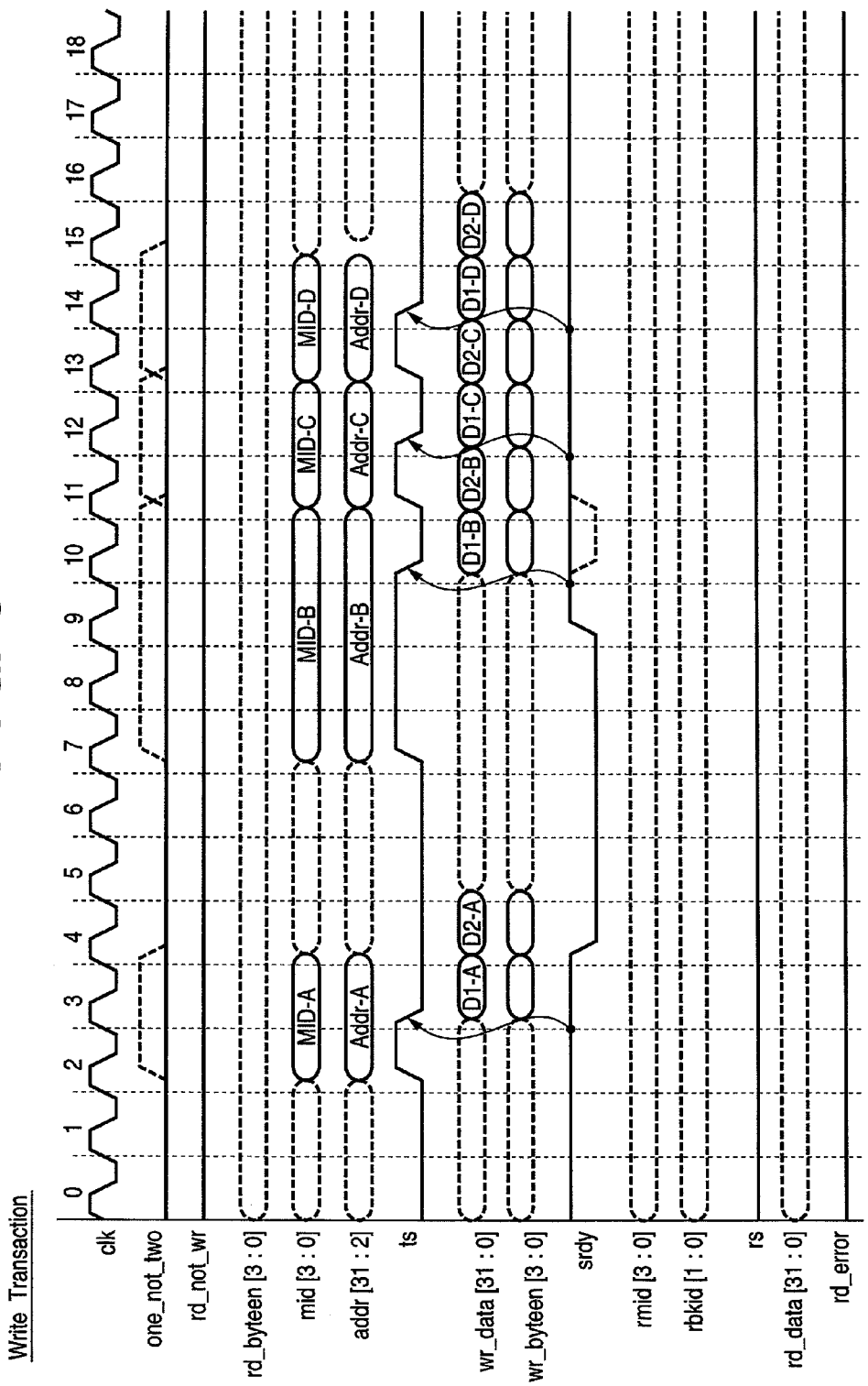
FIG. 6 is a timing chart for explaining the protocol of the system bus according to the first embodiment of the present invention.
Figure 7:
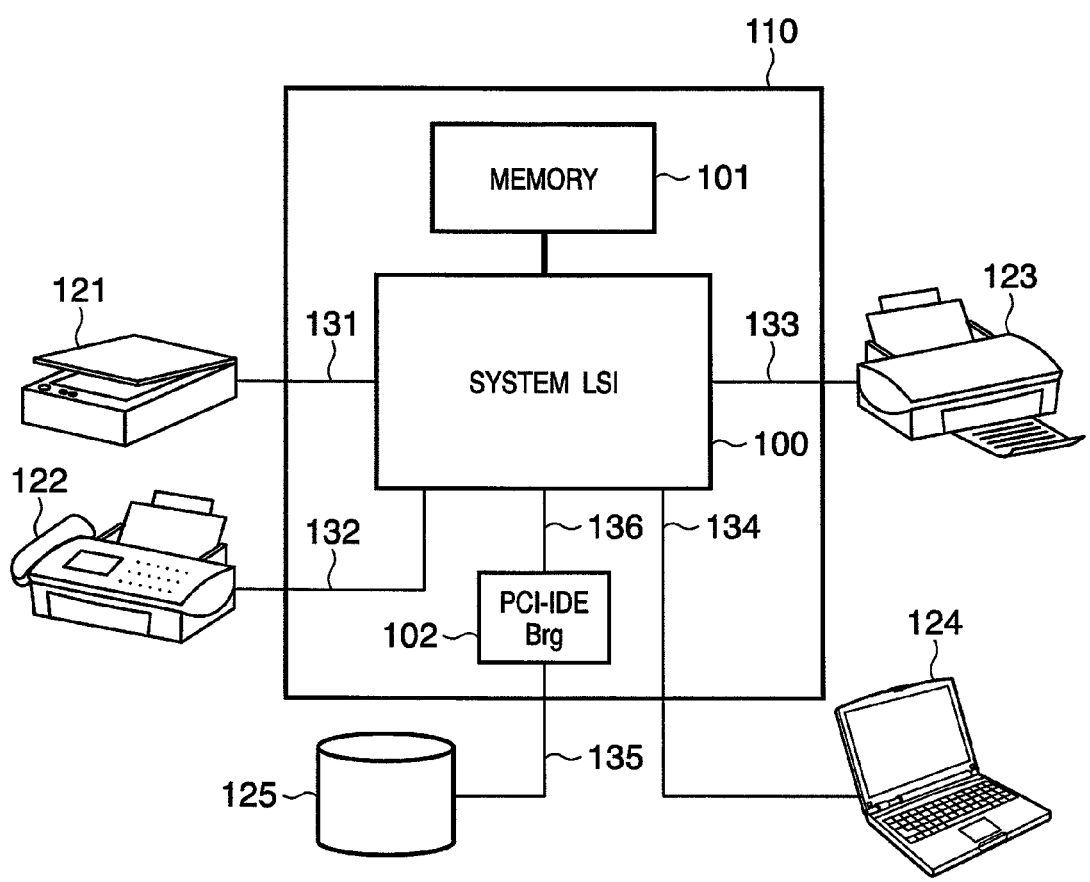
FIG. 7 is a view for explaining a configuration of a prior art.

FIGS. 5 and 6 are timing charts for explaining the bus protocol of the system bus 920 according to the first embodiment of the present invention. FIG. 5 shows read transfer, and FIG. 6 shows write transfer. As described above, the system bus 920 has a multi-layered architecture so that a bus master can be regarded as if it were connected to an arbitrary bus slave in a one-to-one correspondence.

In this embodiment, the system bus 920 includes the following signals.

| | | |
|---|---|---|
| clk | System Bus Clock | Master → Slave |
| ts | Bus Transaction Start | Master → Slave |
| addr[31:2] | Address Bus | Master → Slave |
| mid[3:0] | Master ID | Master → Slave |
| rd_not_wr | Read(H)/Write(L) | Master → Slave |
| one_not_two | Access Size | Master → Slave |
| rd_byteen[3:0] | Read Data Byte Enable | Master → Slave |
| wr_data[31:0] | Write Data Bus | Master → Slave |
| wr_byteen[3:0] | Write Data Byte Enable | Master → Slave |
| srdy | Slave Ready | Slave → Master |
| rrdy | Read Return Ready | Slave → Master |
| rmid[3:0] | Return Master ID | Slave → Master |
| rd_data[31:0] | Read Data Bus | Slave → Master |
| rd_error | Read Error | Slave → Master |

The signals will be described below.

The system bus 920 is a synchronous bus. Assert/deassert of all signals of the system bus 920 is done in synchronism with the leading edge of the system bus clock clk.

To start bus transfer, each bus master starts asserting Transaction Start (ts) and continuously asserts Transaction Start (ts) until srdy is asserted. Transaction Start (ts) is deasserted in the Clock cycle next to assert of srdy. Bus transfer starts in the cycle where both ts and srdy are asserted. The bus master can assert Transaction Start (ts) again after the deassert period of one ts cycle for the next bus transfer.

Address Bus (addr[31:2]) (Master→Slave) is defined simultaneously with ts and held up to one cycle after deasserting ts.

Master ID (mid[3:0]) (Master→Slave) is the ID of the accessing bus master. Master ID (mid[3:0]) is defined simultaneously with ts and held up to one cycle after deasserting ts.

Read(H)/Write(L) (rd_not_wr) (Master→Slave) indicates Read/Write of bus transfer. Read(H)/Write(L) is defined simultaneously with ts and held up to one cycle after deasserting ts. Read(H)/Write(L) indicates High:Read and Low:Write.

Single or 2 beat Burst (one_not_two) (Master→Slave) indicates whether bus transfer on the system bus 920 is Single Transaction or 2 beat Burst Transaction. In Single Transaction, only Data of the first beat is valid. Single or 2 beat Burst (one_not_two) is defined simultaneously with ts and held up to one cycle after deasserting ts. Single or 2 beat Burst indicates High:Single and Low:2 beat Burst.

Read Data Byte Enable (rd_byteen[3:0]) (Master→Slave) indicates Byte Enable in Read. When one_not_two indicates Single, Read Data Byte Enable (rd_byteen[3:0]) indicates the Read byte position in 32 bits. When one_not_two indicates 2 beat Burst, all bits of Read Data Byte Enable (rd_byteen[3:0]) must be Enable. Although wr_byteen[3:0] is valid in Data Phase of Write, Read Data Byte Enable (rd_byteen[3:0]) is valid in Address Phase of Read. Read Data Byte Enable (rd_byteen[3:0]) is defined simultaneously with ts and held up to one cycle after deasserting ts.

Write Data Bus (wr_data[31:0]) (Master→Slave) is a 32-bit Data Bus and indicates Write Data from a master to a slave. Write Data Bus (wr_data[31:0]) is valid from a cycle next to the cycle wherein both ts and srdy are asserted. Write Data Bus (wr_data [31:0]) is valid for only Data of the first beat in Single Transaction and for Data of both the first and second beats in 2 beat Burst Transaction. Which Byte is valid is indicated by wr_byteen[3:0]. Since the system bus 920 is a Big Endian Bus, address 0 is set on the MSB side.

Write Data Byte Enable (wr_byteen[3:0]) (Master→Slave) indicates the valid byte position of Write Data. Write Data Byte Enable (wr_byteen[3:0]) is valid from a cycle next to the cycle wherein both ts and srdy are asserted, like wr_data[31:0]. Write Data Byte Enable (wr_byteen[3:0]) is valid in only the first beat in Single Transaction and in both the first and second beats in 2 beat Burst Transaction.

The correspondence between wr_byteen and wr_data is as follows.

| wr_byteen[3] | wr_data[31:24] |
| wr_byteen[2] | wr_data[23:16] |
| wr_byteen[1] | wr_data[15:8] |
| wr_byteen[0] | wr_data[7:0] |

Slave Ready (srdy) (Slave→Master) indicates that Buffer serving as a slave is ready to receive bus transfer from the master. When Slave Ready (srdy) is asserted, the master can start bus transfer any time, and the slave must absolutely receive bus transfer.

Read Return Ready (rrdy) (Slave→Master) is a signal indicating Read Return from the slave. When Read Data is ready, the slave asserts Read Return Ready (rrdy) and Starts Read Return. Read Return Ready (rrdy) can be asserted any time. Read Data is returned in the same cycle as assert of Read Return Ready (rrdy). In 2 beat Burst, Read Return Ready (rrdy) is asserted for a period corresponding to two cycles, and Read Data corresponding 2 beats is returned. At this time, Read Return Ready (rrdy) need not be asserted continuously, and a wait cycle can be inserted.

Return Master ID (rmid[3:0]) (Slave→Master) is the ID of a master that should receive Read Return. The mid[3:0] asserted upon receiving Read Request is held, and the same ID is returned. The master decodes Return Master ID (rmid [3:0]) at the time of asserting rs and, if the ID is the Master ID of its own, determines that Read Return is addressed to itself. Return Master ID (rmid[3:0]) is asserted simultaneously with rrdy.

Read Data Bus (rd_data [31:0]) (Slave→Master) is a 32-bit Data Bus and indicates Read Data from a slave to a master. Valid data is returned in the cycle wherein rrdy is asserted.

Read Error (rd_error) (Slave→Master) notifies Master of an error from the slave. When an error occurs, the slave asserts Read Error (rd_error) in the same cycle as rrdy in Read Return.

The signals have been described above.

Transaction type will be described next.

In the system bus 920, Single Transaction and 2 beat Transaction are present in both Read and Write.

Switching between Single Transaction and 2 beat Transaction is done by one_not_two.

| one_not_two | Access Size |
|---|---|
| 0 | 2 beats |
| 1 | single |

Bus transfer of 32 bits (4 bytes) or less (byte, half word) is always done by Single bus transfer. In Write, control is done by wr_byteen[3:0]. In Read, control is done by rd_byteen[3:0].

In 2 beat Burst Read, all bits of rd_byteen[3:0] must be Enable.

In 2 beat Burst Access, Address must always be set to the boundary of 64 bits. That is, addr[2] is 0.

Write transaction will be described next with reference to FIG. 6.

The fundamental Protocol is as follows.

In cycle-2, the master asserts ts corresponding to the target slave in starting Write bus transfer. Simultaneously, the master asserts one_not_two, mid[3:0], and addr[31:2].

In cycle-3, since srdy corresponding to the target slave is asserted, Write bus transfer starts, and the master deasserts ts. In addition, the master asserts wr_data[31:0] and wr_byteen [3:0] and outputs Write Data of the first Beat.

In cycle-4, the master deasserts one_not_two, mid[3:0], and addr[31:2]. In addition, the master switches wr_data[31:0] and wr_byteen[3:0] and outputs Write Data of the second Beat.

In cycle-5, Write bus transfer is ended.

If srdy is deasserted although the master asserts ts (cycle-8), the master continuously asserts ts. When srdy is asserted (cycle-9), the master deasserts ts (cycle-10).

To start the next bus transfer, the master can assert ts again after the ts deassert period corresponding to one cycle (cycle-11).

When Write bus transfer continues at the narrowest bus transfer interval, Data Write can be continued without interval.

Read transaction will be described next with reference to FIG. 5.

Read bus transfer is divided into Read Command bus transfer from the master to the slave and Read Data Read Return from the slave to the master. These bus transfer operations are independent and use independent signal lines.

The fundamental Protocol is as follows.

In cycle-2, the master asserts ts corresponding to the target slave in starting Read bus transfer. Simultaneously, the master asserts one_not_two, rd_not_wr, rd_byteen[3:0], mid[3:0], and addr[31:2].

In cycle-3, since srdy corresponding to the target slave is asserted, Read bus transfer starts, and the master deasserts ts.

In cycle-4, the master deasserts one_not_two, rd_not_wr, rd_byteen[3:0], mid[3:0], and addr[31:2].

The end of Read Command bus transfer in Read bus transfer is as follows.

In cycle-6, when Read Data is ready, the slave asserts rrdy and rmid[3:0] to start Read Return. Master ID received from the master by Read Command is set in rmid[3:0].

The slave also asserts rd_data[31:0] and outputs Read Data of first Beat.

In cycle-7, the slave deasserts rrdy. The slave also deasserts rmid[3:0].

In cycle-8, the slave asserts rrdy again. One wait cycle is inserted here. However, an arbitrary wait cycle can be inserted. The slave outputs Read Data of second Beat to rd_data[31:0].

In cycle-9, the slave deasserts rrdy. The slave also deasserts rmid[3:0].

In cycle-10, Read Return is ended.

If srdy is deasserted although the master asserts ts (cycle-8, 9), the master continuously asserts ts. When srdy is asserted, the master deasserts ts (cycle-10).

To start the next bus transfer, the master can assert ts again after the ts deassert period corresponding to one cycle (cycle-11).

If Data to be Returned remains, the slave can continuously assert rrdy to start the next Read Return (cycle-16).

When Read bus transfer continues, Data Read can be continued on the read data bus without interval.

The first embodiment of the present invention will be explained by exemplifying an actual operation.

Figure 10:
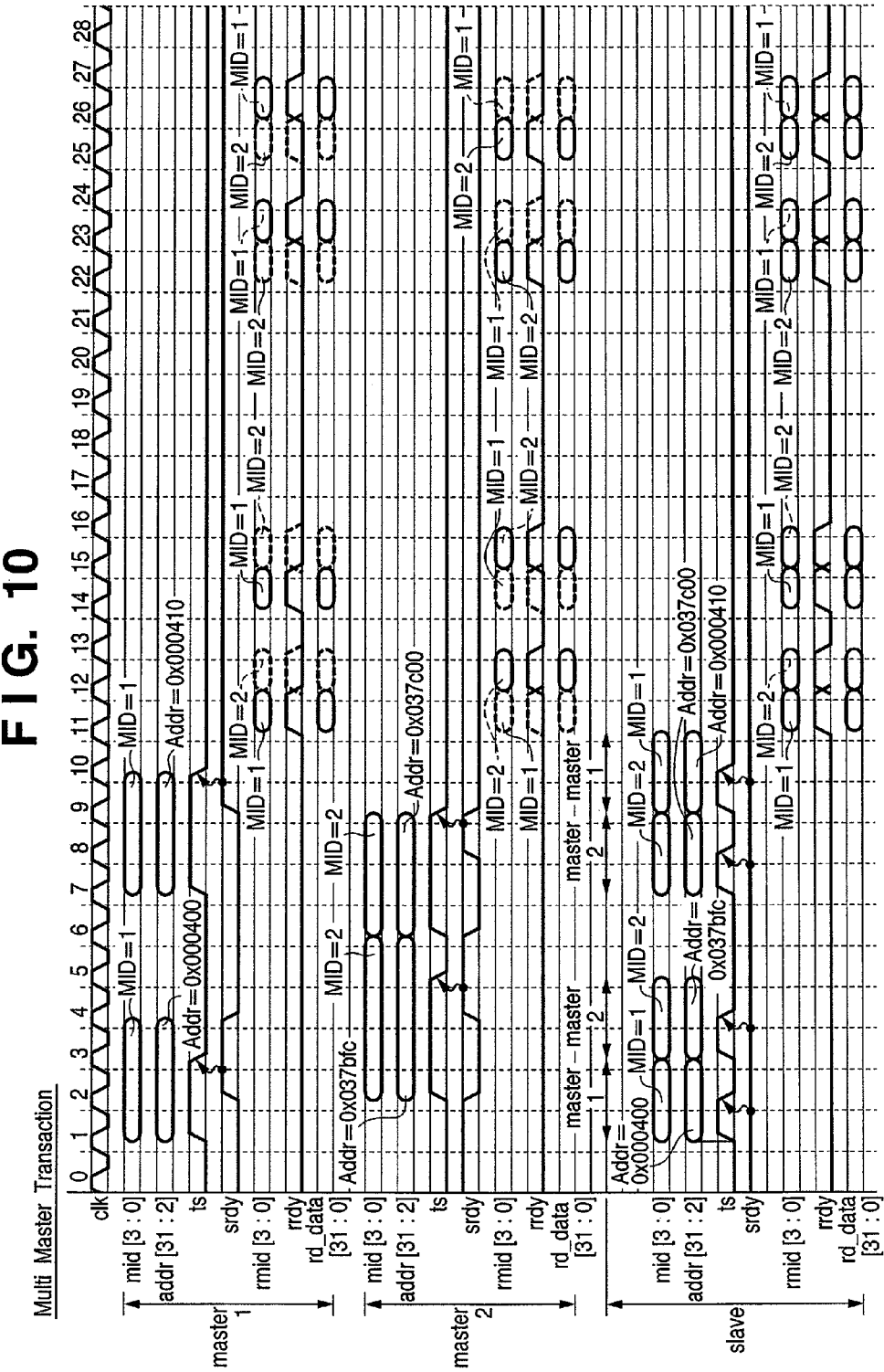
FIG. 10 is a timing chart for explaining the operation timing on the system bus according to the first embodiment of the present invention.
Figure 15:
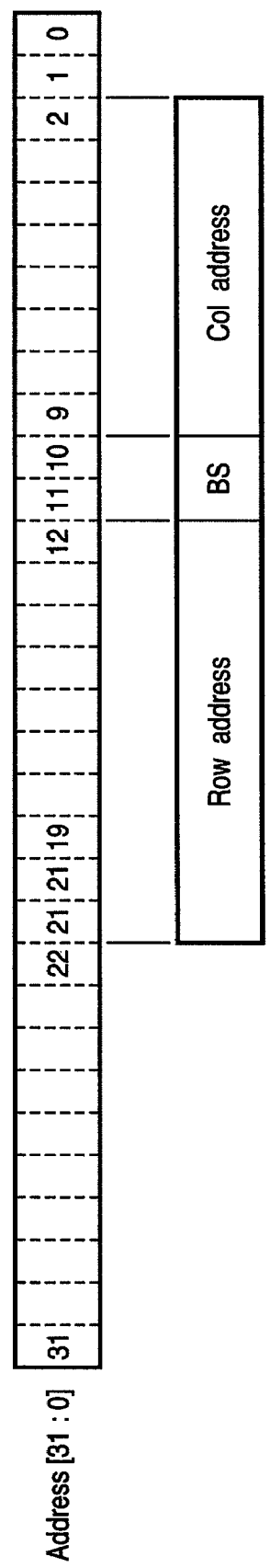
FIG. 15 is a view for explaining an example of the relationship between a physical address, bank address, row address, and column address.

FIG. 10 is a timing chart of an operation of causing the processor 901 and the printer controller 906 to simultaneously read-access the memory controller 902 in FIG. 9. FIG. 15 shows the correspondence between a physical address, and a bank address, row address, and column address of a memory device.

The processor 901 will be referred to as master 1, the printer controller 906 as master 2, and the memory controller 902 as a slave hereinafter.

Referring to FIG. 10, master 1 starts transfer first (cycle-1). The slave asserts srdy and receives its command. The address is addresses 0x00000400. This command is a read command (rd_not_wr=1) and also a 2 beat (one_not_two=0) command, although not illustrated for convenience.

Simultaneously, master 2 starts transfer (cycle-2). The slave asserts srdy and receives the command (cycle-4). The address is 0x00037bfc. This command is also a 2 beat read command.

In a similar way, the slave receives, from masters 2 and 1, 2 beat read commands to addresses 0x00037c00 and 0x00000410, respectively.

The memory controller 902 receives the read command, temporarily stores it in the command queue (702 in FIG. 1), and accesses the memory 904 in the order of reception. At this time, the access is done for each beat of the system bus. In this embodiment, the system bus has a 32-bit configuration. Hence, access is done for every 32 bits. Since the bus width of the memory 904 is 16 bits, a 2 beat read access is issued to the memory, and the read result is returned to the master in 32 bits. Note that the memory 904 is formed from a DDR SDRAM.

That is, in 2 beat access to the memory 904, data is transferred in one system bus clock.

The DDR memory can access the same page in a single device or pages that exist in different banks of a single device in continuous cycles.

Address 0x00000410 of the first read request of master 1 and address 0x00037cfc of the first read request of master 2 exist in pages existing in different banks of a signal device (single chip select).

Hence, access to these pages can be done in continuous cycles.

In the memory controller 902 according to the first embodiment of the present invention, 2 beat (32 bits×2=64 bits) access from master 1 and master 2 is divided into 32-bit accesses which are executed in alternate order. Even in this case, each memory access can be done in continuous cycles. Hence, no wasteful wait cycle occurs.

Figure 11:
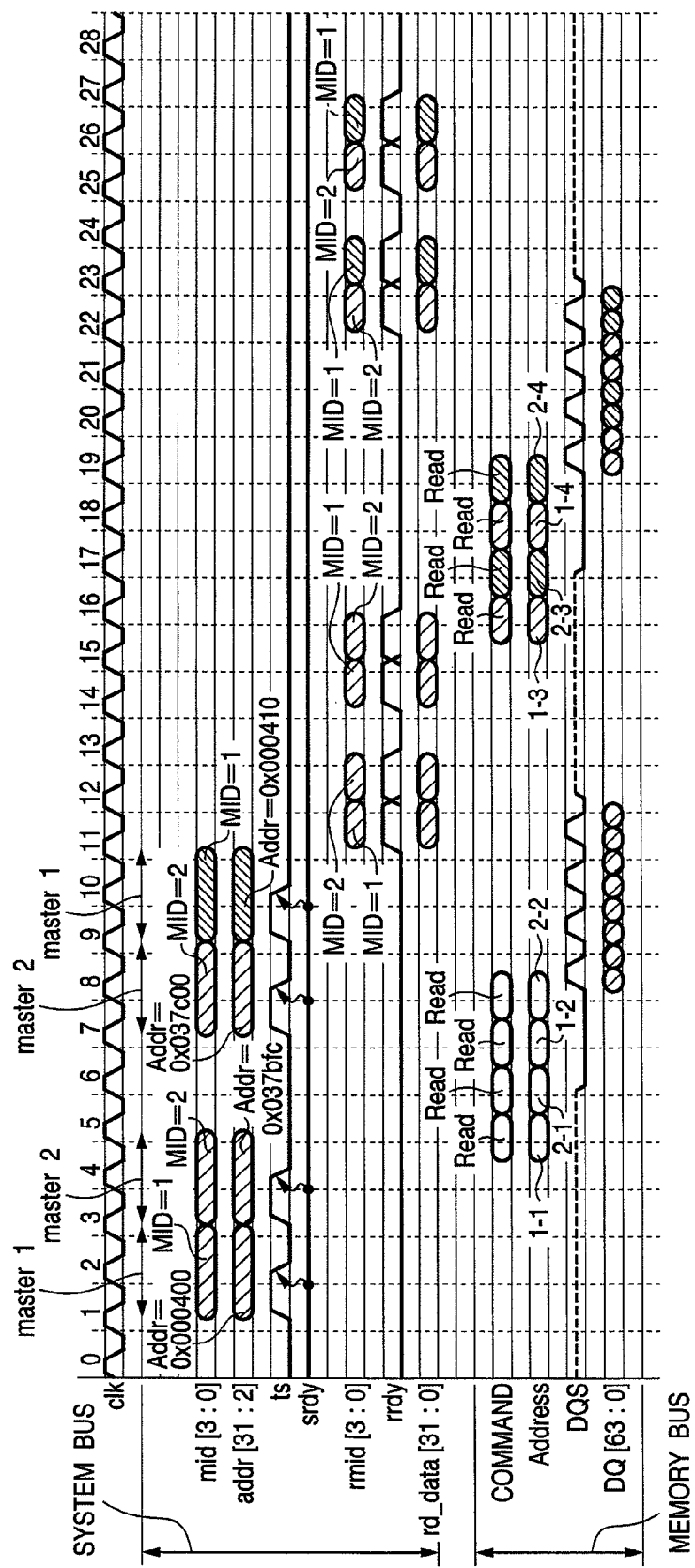
FIG. 11 is a timing chart for explaining the operation timing on the system bus and memory bus according to the first embodiment of the present invention.

FIG. 11 shows the relationship of timings on the system bus and memory bus. As shown in FIG. 11, the memory controller 902 generates a plurality of commands whose unit of data transfer is smaller than the unit of data transfer (64 bits) of the memory access request. When a plurality of request sources (masters 1 and 2) issue memory access requests, the memory controller 902 issues a plurality of commands to the memory 904 in alternate order. In this way, a plurality of memory access requests are executed by time division and concurrently. Only when the memory access request is a memory read request, the memory controller 902 issues a plurality of commands to the memory 904 in alternate order for the respective request sources. A command queue 701 (FIG. 1) sequentially stores received memory access requests. Only the first and second access requests in the command queue 701 are candidates to issue the plurality of commands in alternate order.

As a result of the above-described operation, in cycle-11, the slave asserts rrdy and returns a 1 beat read return. At this time, MID=1, and master 1 receives the read return. Next in cycle-12, the slave asserts rrdy and returns a 1 beat read return. At this time, MID=2, and master 2 receives the read return.

The next cycle-13 includes one wait cycle. This depends on the internal timing generation method implemented in the memory controller of this embodiment but is not directly relevant to the present invention and a description thereof will be omitted. This cycle can be omitted depending on the memory controller implementation method.

In cycle-14, the slave asserts rrdy and returns a 1 beat read return. At this time, MID=1, and master 1 receives the read return. This is the second beat data corresponding to the first read access request issued by master 1. Next in cycle-15, the slave asserts rrdy and returns a 1 beat read return. At this time, MID=2, and master 2 receives the read return. This is the second beat data corresponding to the first read access request issued by master 2.

More specifically, in the prior art, the first read return data for master 2 is sent after all read return data corresponding to the access request of master 1 are sent, i.e., in 13th or 14th cycle. To the contrary, in the first embodiment of the present invention, the first read return data is returned to master 2 in an earlier cycle.

In a similar way, 1 beat data is returned for each master in alternate order in cycle-22, 23, 25, and 26 in correspondence with the second read access requests from masters 1 and 2.

As described above, according to the first embodiment of the present invention, when memory access requests are issued simultaneously from the plurality of masters in the system LSI, their units of data transfer are divided, and memory access is done in alternate order. With this arrangement, the average latency of the first return data to each master can be reduced.

Hence, the FIFO capacity required by each master can be decreased, and the circuit scale can be reduced.

The present invention has been illustrated and described above in association with a specific embodiment. However, various changes and modifications can be made.

For example, in the first embodiment of the present invention, 1 beat or 2 beat transfer has been described as the burst transfer of the system bus for the descriptive convenience. However, the present invention is not limited to this. Actually, the longer the beat length becomes, the more conspicuous the effect of the present invention becomes.

In the first embodiment of the present invention, the beat length in accessing a memory device is 2. However, the present invention can be applied to an arbitrary beat length.

The second embodiment of the present invention will be described next. The block diagram of this embodiment, the view for explaining the configuration of a system LSI 800, and details of a memory controller are the same as in FIGS. 8, 9, and 1.

Figure 12:
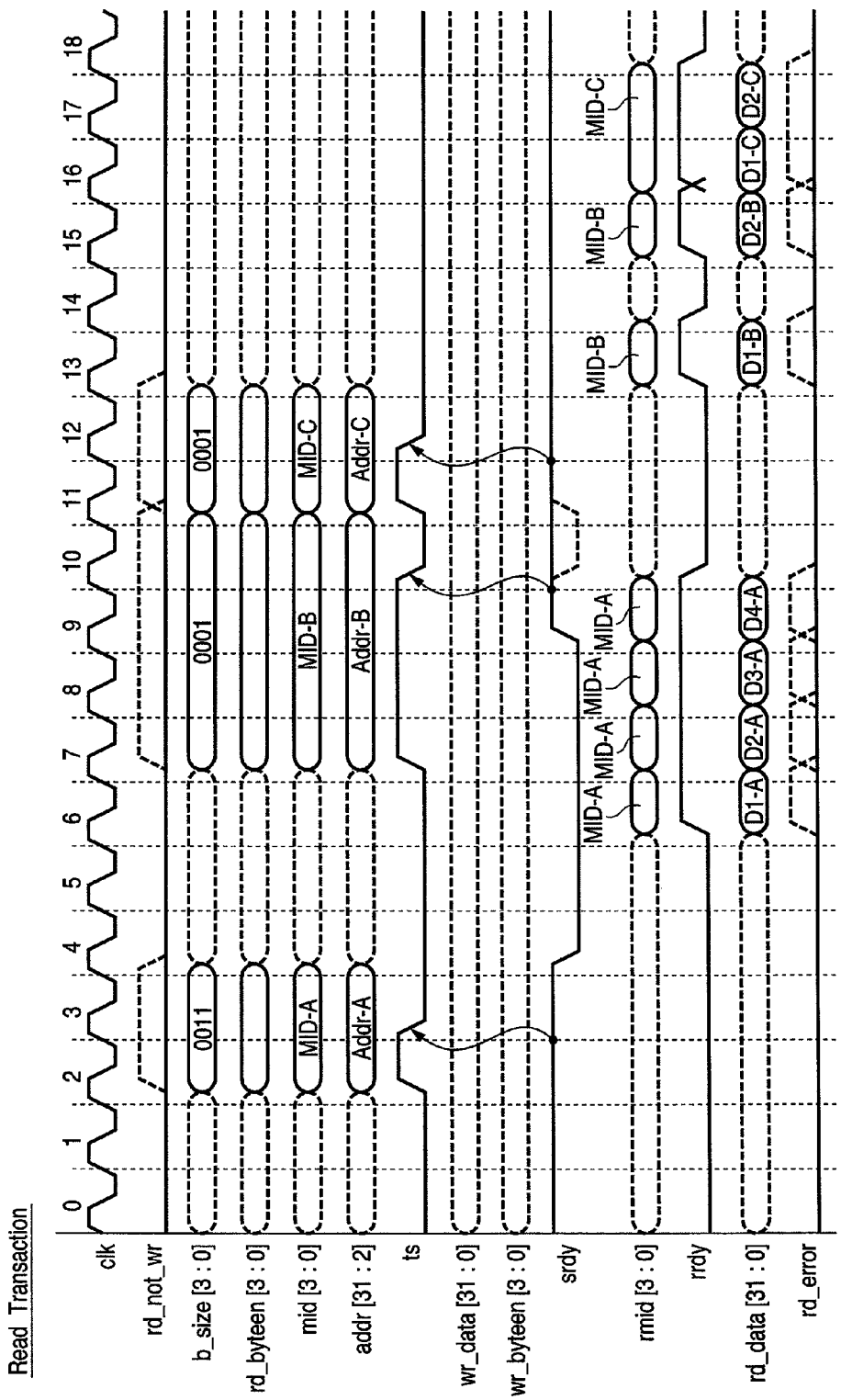
FIG. 12 is a timing chart for explaining the protocol of a system bus according to an embodiment of the present invention.
Figure 13:
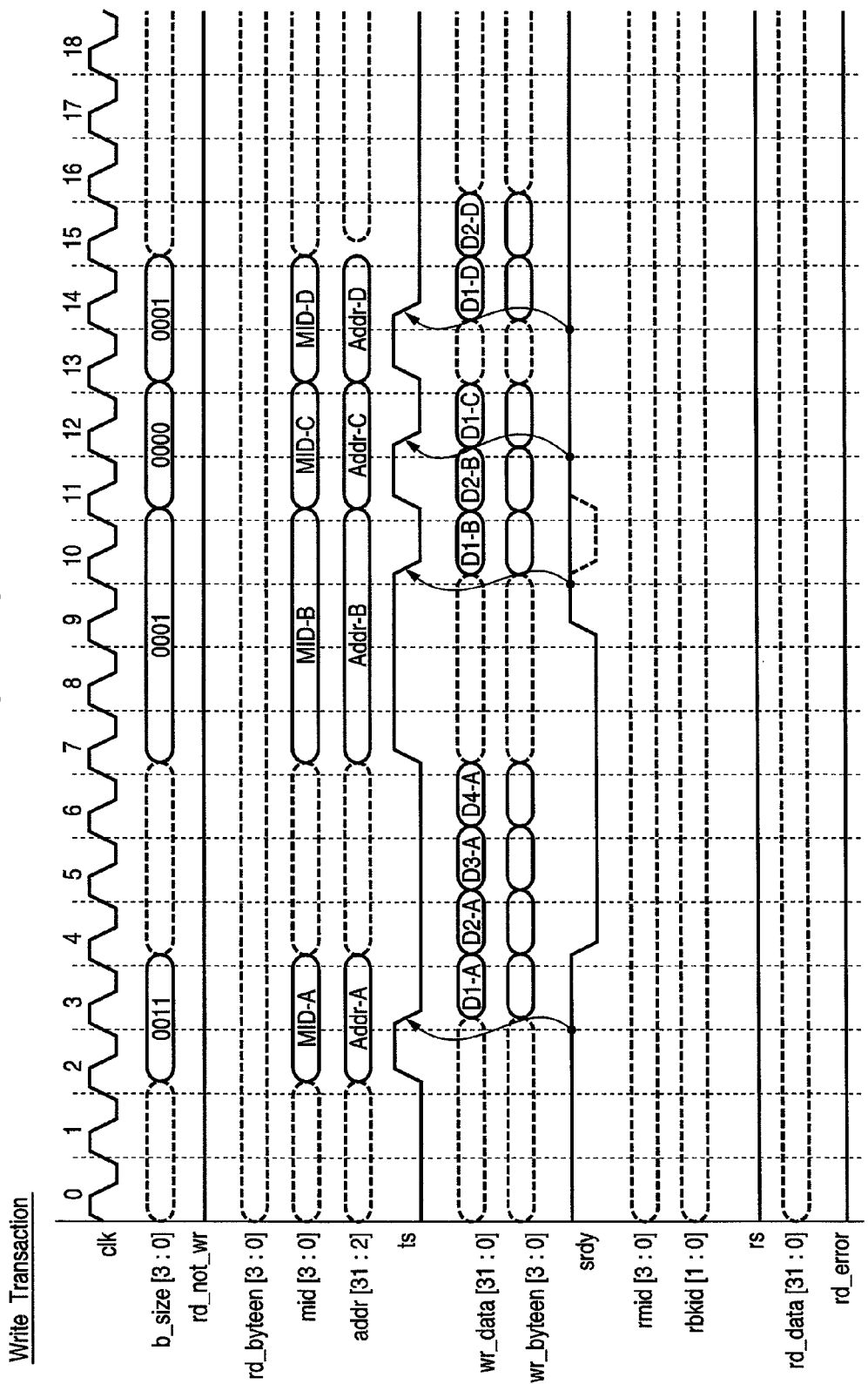
FIG. 13 is a timing chart for explaining the protocol of a system bus according to an embodiment of the present invention.

FIGS. 12 and 13 are views for explaining the bus protocol of a system bus 920 according to the second embodiment of the present invention. FIG. 12 shows read transfer, and FIG. 13 shows write transfer. As described above, the system bus 920 has a multi-layered architecture so that a bus master can be regarded as if it were connected to an arbitrary bus slave in a one-to-one correspondence.

The signals included in the system bus 920 will be described below. A description of signals common to the first embodiment will be omitted.

| b_size[3:0] | Access Size | Master → Slave |
|---|---|---|

Burst size (b_size[3:0]) (Master→Slave) indicates the number of bursts of bus transfer on the system bus 920, for which 1 to 16 beats can be designated. Burst size is defined simultaneously with ts and held up to one cycle after deasserting ts.

In this case, 0000 indicates 1 beat; 0001, 2 beats, . . . ; and 1111, 16 beats.

Read Data Byte Enable (rd_byteen[3:0]) (Master→Slave) indicates Byte Enable in Read.

When b_size[3:0] indicates Single, rd_byteen[3:0] indicates which byte position of the 32 bits is subjected to Read. When b_size indicates 2 beat burst or more, the signal is invalid, and all bits are handled as Enable. The signal wr_byteen[3:0] is valid in Data Phase in Write. Read Data Byte Enable (rd_byteen[3:0]) is valid in Address Phase in Read. Read Data Byte Enable (rd_byteen[3:0]) is defined simultaneously with ts and held up to one cycle after deasserting ts.

Write transaction will be described next with reference to FIG. 13.

The fundamental Protocol is as follows.

In cycle-2, the master asserts ts corresponding to the target slave in starting Write bus transfer. Simultaneously, the master asserts b_size[3:0], rd_not_wr, mid[3:0], and addr[31:2].

In cycle-3, since srdy corresponding to the target slave is asserted, Write bus transfer starts, and the master deasserts ts.

In addition, the master asserts wr_data[31:0] and wr_byteen [3:0] and outputs Write Data of the first Beat.

In cycle-4, the master deasserts b_size[3:0], rd_not_wr, mid[3:0], and addr[31:2]. In addition, the master switches wr_data[31:0] and wr_byteen[3:0] and outputs Write Data of the second Beat.

In cycle-5, Write bus transfer is ended.

If srdy is deasserted although the master asserts ts (cycle-8, 9), the master continuously asserts ts. When srdy is asserted, the master deasserts ts (cycle-10).

To start the next bus transfer, the master can assert ts again after the ts deassert period corresponding to one cycle (cycle-11).

When Write bus transfer continues at the narrowest bus transfer interval, Data Write can be continued without interval.

Read transaction will be described next with reference to FIG. 12.

Read bus transfer is divided into Read Command bus transfer from the master to the slave and Read Data Read Return from the slave to the master. These bus transfer operations are independent and use independent signal lines.

The fundamental Protocol is as follows.

In cycle-2, the master asserts ts corresponding to the target slave in starting Read bus transfer. Simultaneously, the master asserts b_size[3:0], rd_not_wr, rd_byteen[3:0], mid[3:0], and addr[31:2].

In cycle-3, since srdy corresponding to the target slave is asserted, Read bus transfer starts, and the master deasserts ts.

In cycle-4, the master deasserts b_size[3:0], rd_not_wr, rd_byteen [3:0], mid [3:0], and addr[31:2].

The end of Read Command bus transfer in Read bus transfer is as follows.

In cycle-6, when Read Data is ready, the slave asserts rrdy and rmid[3:0] to start Read Return. Master ID received from the master by Read Command is set in rmid[3:0].

The slave also asserts rd_data[31:0] and outputs Read Data of first Beat.

In cycle-7, the slave outputs Read Data of second Beat to rd_data[31:0].

In cycle-10, the slave deasserts rrdy. The slave also deasserts rmid[3:0].

In cycle-10, Read Return is ended.

If srdy is deasserted although the master asserts ts (cycle-8, 9), the master continuously asserts ts. When srdy is asserted, the master deasserts ts (cycle-10).

To start the next bus transfer, the master can assert ts again after the ts deassert period corresponding to one cycle (cycle-11).

If Data to be Returned remains, the slave can continuously assert rrdy to start the next Read Return (cycle-16).

When Read bus transfer continues, Data Read can be continued on the read data bus without interval.

The embodiment of the present invention will be explained by exemplifying an actual operation.

Figure 14:
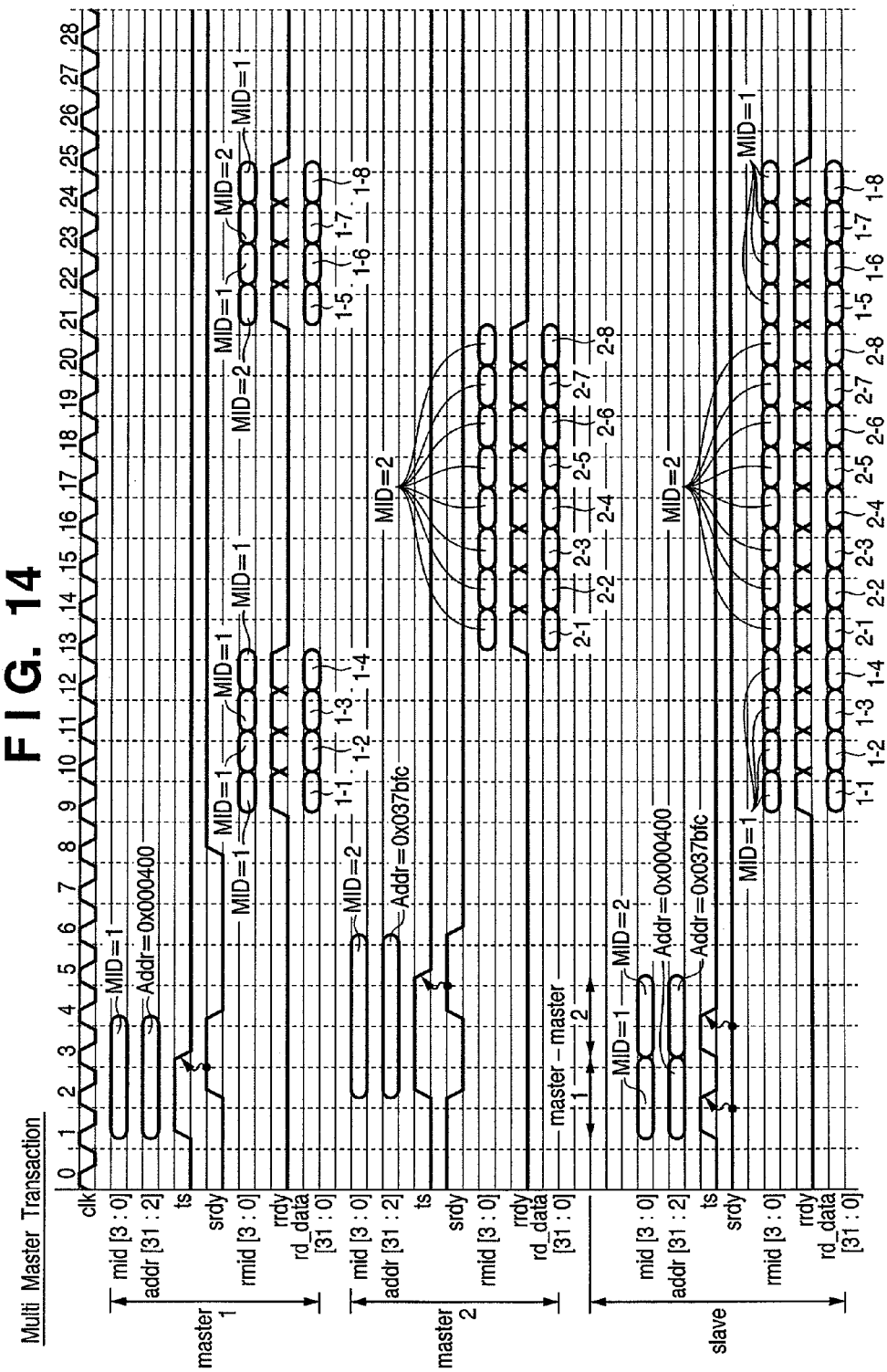
FIG. 14 is a timing chart for explaining the operation timing on the system bus according to an embodiment of the present invention.

FIG. 14 is a timing chart of an operation of causing a processor 901 and a printer controller 906 to simultaneously read-access a memory controller 902 in FIG. 9. FIG. 15 shows the correspondence between a physical address, and a bank address, row address, and column address of a memory device.

The processor 901 will be referred to as master 1, the printer controller 906 as master 2, and the memory controller 902 as a slave hereinafter.

In this embodiment, master 2 is given higher priority over master 1. In this embodiment, a detailed description of how to give the priority will be omitted. The priority may permanently set in advance or dynamically designated at the time of execution.

Referring to FIG. 14, master 1 starts transfer first (cycle-1). The slave asserts srdy and receives its command. The address is addresses 0x00000400. This command is a read command (rd_not_wr=1) and also an 8 beat (b_size=0111) command, although not illustrated for convenience. Simultaneously, master 2 starts transfer (cycle-2). The slave asserts srdy and receives the command (cycle-4). The address is 0x00037bfc. This command is also an 8 beat read command.

The memory controller 902 receives the read command, temporarily stores it in the command queue (702 in FIG. 1), and determine bank conflict. In this example, since neither memory access of master 1 nor that of master 2 have bank conflict, the memory controller 902 accesses a memory 904 in the order of reception. If memory access of master 1 has bank conflict, and memory access of master 2 has no bank conflict, the memory access request of master 2 is processed first.

In this embodiment, the system bus has a 32-bit configuration. Hence, the master executes access for every 32 bits on the system bus. Since the bus width of the memory 904 is 64 bits, the memory controller 902 issues a 4 beat read access to the memory 904 in correspondence with 8 beat transfer on the system bus and returns the read result to the master in every 32 bits.

Note that the memory 904 is formed from a DDR SDRAM. That is, in 2 beat access to the memory 904, data is transferred in one system bus clock.

The DDR memory can access the same page in a single device or pages that exist in different banks of a single device in continuous cycles.

Address 0x00000410 of the first read request of master 1 and address 0x00037cfc of the first read request of master 2 exist in pages existing in different banks of a signal device (single chip select). Hence, access to these pages can be done in continuous cycles.

Figure 16:
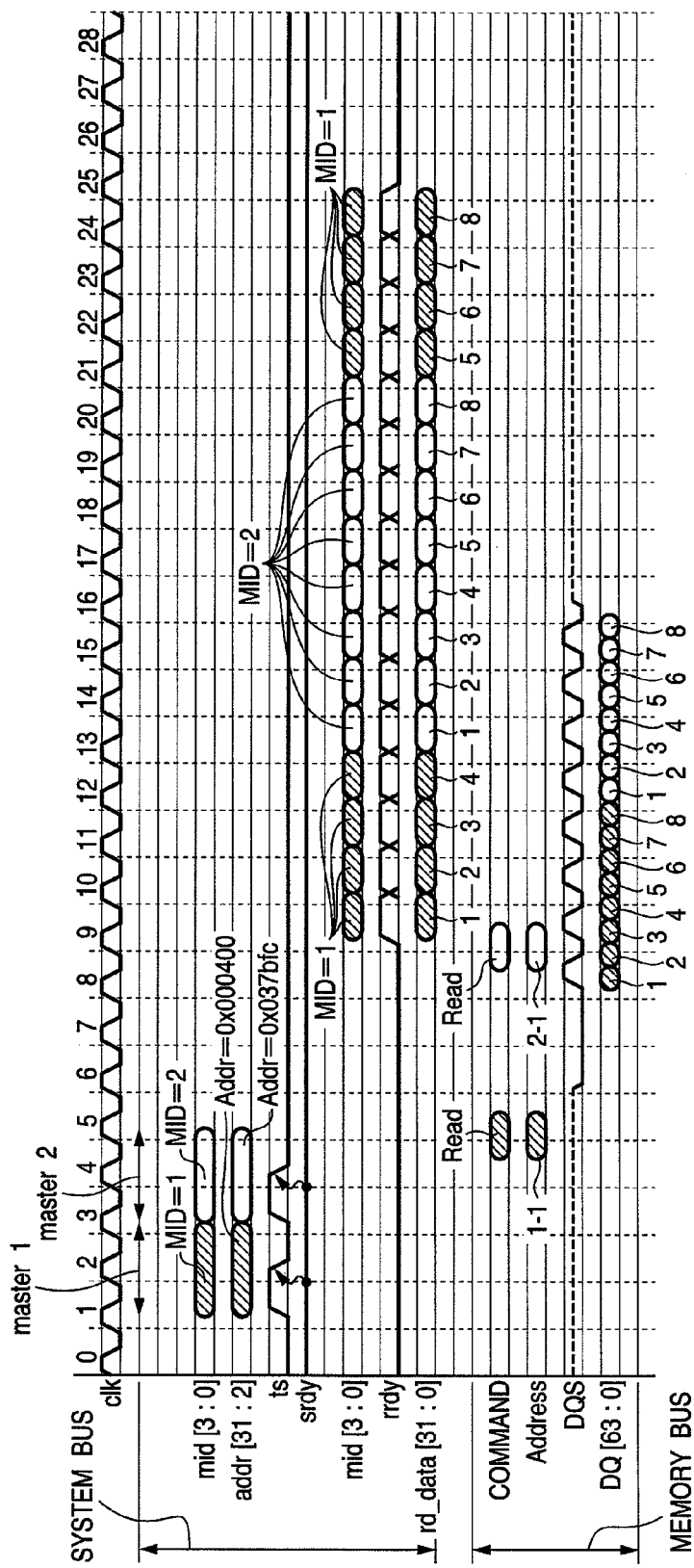
FIG. 16 is a timing chart for explaining the operation timing on the system bus and memory bus according to an embodiment of the present invention.

FIG. 16 shows the relationship of timings on the system bus and memory bus.

Referring to FIG. 16, the memory controller 902 according to an embodiment of the present invention issues a read command to the memory 904 in cycle-4 in correspondence with an 8 beat (32 bits×8=256 bits) access from master 1 first. On the memory bus, 64 bits×4 beat transfer is done. Readout data is temporarily stored in a read data buffer 704 (FIG. 1) (cycle-8 to cycle-11). Each 32 bit data is sequentially returned to master 1 as soon as the data is ready (cycle-9 to cycle-12).

During this time, the memory controller 902 issues a read command to the memory 904 again in cycle-8 to process subsequent 8 beat access (32 bits×8=256 bits) from master 2. On the memory bus, 64 bits×4 beat transfer is done following the preceding transfer (cycle-12 to cycle-15). Master 2 has higher priority over master 1. Hence, when the first read data is read out in cycle-12, the memory controller 902 interrupts read return to master 1 and returns read data to master 2 from cycle-13. When all 8 beat read return to master 2 is ended, the memory controller 902 resumes read return to master 1 from cycle-21. That is, in this embodiment, read data as a result of access to the memory 904 in accordance with read requests from a plurality of request sources (masters 1 and 2) is stored in the read data buffer 704. The read data from the read buffer 704 is transferred in an order corresponding to the priority set for the plurality of request sources (masters 1 and 2). Received read requests are sequentially stored in the command queue 702. The memory 904 is accessed by extracting a command from the command queue 702 while avoiding bank conflict.

As described above, the first read return data to master 2 is returned before all read returns corresponding to the access request of master 1 are completed (before cycle-7).

As described above, according to the second embodiment of the present invention, even when memory access requests from the plurality of masters in the system LSI conflict, any decrease in memory access efficiency can be prevented, and any increase in memory access latency of a master with high priority can be suppressed.

The present invention has been illustrated and described above in association with a specific embodiment. However, various changes and modifications can be made.

For example, in the second embodiment of the present invention, a bus having specific signals and protocol is used as the system bus. However, the present invention is not limited to this, and an arbitrary bus may be used as the system bus. In addition, a plurality of bus interfaces of the memory controller may be provided as needed.

For example, in the second embodiment of the present invention, a detailed description of the method of setting priority between masters has been omitted. The priority may be given in a unit of data transfer by using, e.g., a system bus having a priority signal.

In the first and second embodiments of the present invention, a DDR SDRAM is used as a memory device. However, the present invention is not limited to this.

For example, in the second embodiment of the present invention, the beat length in access to the memory device is 8. However, the present invention can be applied to an arbitrary beat length.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2005-205707 and 2005-205708, both filed on Jul. 14, 2005, which are hereby incorporated by reference herein in their entirety.

What is claimed is:

1. A memory control apparatus comprising:
receiving means for receiving a plurality of read requests from a plurality of request sources;
read means for reading data from a memory in accordance with the plurality of read requests;
storage means for storing the read data read from the memory corresponding to the plurality of read requests; and
transfer means for transferring the read data from said storage means to a second request source having priority higher than a first request source in a case that data transfer to the first request source is interrupted by a read request from the second request source, wherein data transfer to the first request source is interrupted if the read data to be transferred to the second request source is stored by said storage means while said transfer means transfers the read data to the first request source, and wherein the requested data transfer to the second request source is completed before resuming the interrupted data transfer to the first request source.

2. The apparatus according to claim 1, further comprising a command queue that sequentially stores the received read requests,
wherein the memory is accessed by extracting a command from said command queue while avoiding bank conflict.

3. A memory control method comprising the steps of:
receiving a plurality of read requests from a plurality of request sources;
reading data from a memory in accordance with the plurality of read requests;
storing the read data read from the memory corresponding to the plurality of read requests; and
transferring the stored read data to a second request source having priority higher than a first request source in a case that data transfer to the first request source is interrupted by a read request from the second request source, wherein data transfer to the first request source is interrupted if the read data to be transferred to the second request source is stored by a storage means while a transfer means transfers the read data to the first request source, and wherein the requested data transfer to the second request source is completed before resuming the interrupted data transfer to the first request source.

4. An embedded equipment having a memory, a system bus, and a memory controller,
said memory controller comprising a buffer for temporarily storing data read from said memory in accordance with a plurality of read requests received from a plurality of request sources, and for transferring the read data from said buffer means to a second request source having priority higher than a first request source in a case that data transfer to the first request source is interrupted by a read request from the second request source, wherein data transfer to the first request source is interrupted if the read data to be transferred to the second request source is stored by a storage means while a transfer means transfers the read data to the first request source, and wherein the requested data transfer to the second request source is completed before resuming the interrupted data transfer to the first request source.

5. The equipment according to claim 4, wherein said memory controller comprises a command queue that sequentially stores the received read requests and accesses said memory by extracting a command from said command queue while avoiding bank conflict.

6. The equipment according to claim 4, wherein said system bus transfers an identifier of a bus master to a slave, and the slave returns read data to the bus master together with the identifier of the bus master.

7. The equipment according to claim 4, wherein said memory comprises a DDR SDRAM.

8. The equipment according to claim 4, wherein said system bus comprises a multi-layered architecture.

9. The equipment according to claim 4, wherein said memory controller and said system bus are incorporated in one system LSI.

10. The apparatus according to claim 1, wherein said read means starts to read the data to be transferred to the second request source while the data to be transferred to the first request source is read, in a case where a read request from the second request source is received after that from the first request source.

11. The method according to claim 3, wherein the data to be transferred to the second request source is read while the data to be transferred to the first request source is read, in a case where a read request from the second request source is received after that from the first request source.

12. The equipment according to claim 4, wherein the data to be transferred to the second request source is read while the data to be transferred to the first request source is read, in a case where a read request from the second request source is received after that from the first request source.

* * * * *